(12) United States Patent
Zhou

(10) Patent No.: US 9,891,373 B2
(45) Date of Patent: Feb. 13, 2018

(54) DISPLAY DEVICE AND BACKLIGHT MODULE THEREOF

(71) Applicant: Wuhan China Star Optoelectronics Technology Co., Ltd., Wuhan, Hubei (CN)

(72) Inventor: Gege Zhou, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 256 days.

(21) Appl. No.: 14/443,614

(22) PCT Filed: Apr. 13, 2015

(86) PCT No.: PCT/CN2015/076442
§ 371 (c)(1),
(2) Date: May 18, 2015

(87) PCT Pub. No.: WO2016/161664
PCT Pub. Date: Oct. 13, 2016

(65) Prior Publication Data
US 2017/0045677 A1    Feb. 16, 2017

(30) Foreign Application Priority Data

Apr. 7, 2015 (CN) .......................... 2015 1 0161787

(51) Int. Cl.
F21V 7/04 (2006.01)
F21V 8/00 (2006.01)
G02F 1/1335 (2006.01)
(52) U.S. Cl.
CPC ......... *G02B 6/0088* (2013.01); *G02F 1/1336* (2013.01); *G02B 6/0033* (2013.01);
(Continued)

(58) Field of Classification Search
USPC .......................................................... 362/607
See application file for complete search history.

(56) References Cited

U.S. PATENT DOCUMENTS 8,502,788 B2    8/2013  Cho
8,928,836 B2    1/2015  Wang et al.
(Continued)

FOREIGN PATENT DOCUMENTS

CN    2916826      6/2007
CN    201259587    6/2009
(Continued)

OTHER PUBLICATIONS

International Search Report for PCT/CN2015/076442, English Translation attached to original, Both completed by the Chinese Patent Office dated Nov. 6, 2015, All together 6 Pages.
(Continued)

*Primary Examiner* — Ahshik Kim
(74) *Attorney, Agent, or Firm* — Mintz Levin Cohn Ferris Glovsky and Popeo, P.C.; Kongsik Kim

(57) ABSTRACT

Provided is a backlight module including a light guide plate having a horizontal light guide plate body and a first bent portion near a non-incidence side; and an optical assembly having a horizontal optical assembly body and a second bent portion near the non-incidence side, the optical assembly body is attached tightly to an upper surface of the light guide plate body, and the second bent portion is attached tightly to the first bent portion. Further provided is a display device having the backlight module. By removing the frame and the back plate portion on at least one incidence side and bending corresponding ends of the light guide plate and the optical assembly, multi-side backlight effect of the backlight module is achieved.

20 Claims, 1 Drawing Sheet

(52) U.S. Cl.
CPC .......... *G02B 6/0051* (2013.01); *G02B 6/0053* (2013.01); *G02B 6/0055* (2013.01)

(56) References Cited

U.S. PATENT DOCUMENTS

| | | | |
|---|---|---|---|
| 2013/0076649 A1 | 3/2013 | Myers et al. | |
| 2013/0300697 A1 | 11/2013 | Kim et al. | |
| 2014/0055703 A1* | 2/2014 | Gu | G02B 6/0035 349/58 |
| 2014/0153281 A1* | 6/2014 | Zhao | G02B 6/0055 362/607 |
| 2015/0253485 A1* | 9/2015 | Xiong | G02F 1/133308 362/607 |

FOREIGN PATENT DOCUMENTS

| | | |
|---|---|---|
| CN | 101739171 | 6/2010 |
| CN | 202152969 | 2/2012 |
| CN | 202361206 | 8/2012 |
| CN | 202533599 | 11/2012 |
| CN | 102865516 | 1/2013 |
| CN | 102913822 | 2/2013 |
| CN | 102966887 | 3/2013 |
| CN | 103742809 | 4/2014 |
| CN | 104407465 | 3/2015 |
| JP | 2001067919 | 3/2001 |
| JP | 2007329089 | 12/2007 |

OTHER PUBLICATIONS

Chinese Search Report for Chinese Application No. CN 2015101617874, dated Oct. 21, 2016, 2 Pages.

Chines Office Action for Chinese Application No. CN 201510161787.4, English translation attached to original, Both completed by the Chinese Patent Office dated Oct. 31, 2016, All together 14 Pages.

\* cited by examiner

DISPLAY DEVICE AND BACKLIGHT MODULE THEREOF

CROSS-REFERENCE TO RELATED APPLICATION

This application is the U.S. national phase of PCT Application No. PCT/CN2015/076442 filed on Apr. 13, 2015, which claims priority to CN Patent Application No. 201510161787.4 filed on Apr. 7, 2015, the disclosures of which are incorporated in their entirety by reference herein.

BACKGROUND OF THE INVENTION

1. Field of the Invention

The present disclosure relates to a field of display technology, and in particular, relates to a display device and a backlight module thereof.

2. The Related Arts

With the rapid development of LCD (Liquid Crystal Display) panel industry, the LCD display gradually becomes the trend of display technology due to its many advantages such as ultra-thin, light weight, radiationless, stable performance or the like. Most of liquid crystal displays in market are backlight type liquid crystal display device having a liquid crystal display panel and a backlight module, wherein the display panel is mounted and protected by a bezel of the backlight module.

Generally, the backlight module comprises a light guide plate, a frame surrounding the light guide plate, a lamp source flexible circuit board and a light shielding tape. The lamp source flexible circuit board is fixed on the light guide plate and the frame by the light shielding tape, and an optical film is fixed on the frame by the light shielding double-sided tape as well, and a liquid crystal display screen is fixed to periphery of a backlight unit by a double-sided adhesive. However, such common backlight module can perform a backlight display towards only one direction, resulting in the display device can only achieve one-side displaying. In certain occasions, in order to improve the continuity of display images, a plurality of backlight modules or display devices are needed if displaying of adjacent sides is required to be achieved simultaneously, thereby cost of production is increased, the number of internal members is increased, it is more difficult to assemble, and the production efficiency is greatly reduced.

SUMMARY

In view of the disadvantages of the prior art, a display device that has simple structure and is low-cost and ease of assembling, and a backlight module thereof are provided.

According to an embodiment of the disclosure, there is provided a backlight module comprising: a light guide plate, comprising a horizontal light guide plate body and a first bent portion near a non-incidence side; and an optical assembly, comprising a horizontal optical assembly body and a second bent portion located near the non-incidence side, wherein the optical assembly body is attached tightly to an upper surface of the light guide plate body, and the second bent portion is attached tightly to the first bent portion.

The backlight module further comprises a reflecting sheet attached tightly to a lower surface of the light guide plate, and the reflecting sheet comprises a horizontal reflecting sheet body and a third bent portion located near the non-incidence side and attached tightly to the first bent portion.

The backlight module further comprises a back plate, and the back plate comprises a horizontal back plate body attached tightly to a lower surface of the reflecting sheet body.

A bent angle of the first bent portion with respect to the light guide plate body is equal to a bent angle of the second bent portion with respect to the optical assembly body.

The bent angle of the first bent portion with respect to the light guide plate body is not larger than 90°.

The optical assembly further comprises a packing portion located near an end of the non-incidence side, and the packing portion extends from the second bent portion and packs the end of the first bent portion.

The optical assembly comprises an upper brightness enhancement sheet, a lower brightness enhancement sheet and a diffusion sheet stacked sequentially on an upper surface of the light guide plate from up to down, and the packing portion is a portion of the upper brightness enhancement sheet.

According to another embodiment of the disclosure, there is provided a display device comprising a first display panel, a second display panel, and the backlight module described as above, wherein the first display panel and the second display panel are disposed opposite to an external surface of the optical assembly body and an external surface of the second bent portion, respectively.

Two sides of the first display panel and the second display panel in width direction are attached onto the optical assembly by a double-sided light shielding tape.

The double-sided light shielding tape comprises a first light shielding tape disposed at bent position of the optical assembly body and the second bent portion and meanwhile attached to lower surfaces of the first display panel and the second display panel.

The present disclosure removes the frame and the back plate portion on at least one incidence side, and bends corresponding ends of the light guide plate and the optical assembly to form a lateral bent portions, thereby light from the incidence sides emits not only through the lateral bent portions but also through an upper surface of the backlight module, such that multi-side backlight effect is achieved; meanwhile, the display panel is disposed on the upper surface and side surface of the backlight module to form a display device, thus the display device can achieve a displaying of upper and side surfaces, such that advantages such as multi-side displaying, simple structure, low cost and convenient assembling can be achieved, thereby application filed of display device is extended.

DETAILED DESCRIPTION OF EXEMPLARY EMBODIMENTS

The present disclosure will be further described in detail hereinafter with reference to the accompanying drawings and embodiments, such that the purposes, technical solutions and advantages of present disclosure are more clearly understood. It should be understood that the described certain embodiments are merely used to explain the present disclosure, and not intended to be limiting of the disclosure.

Figure 1:
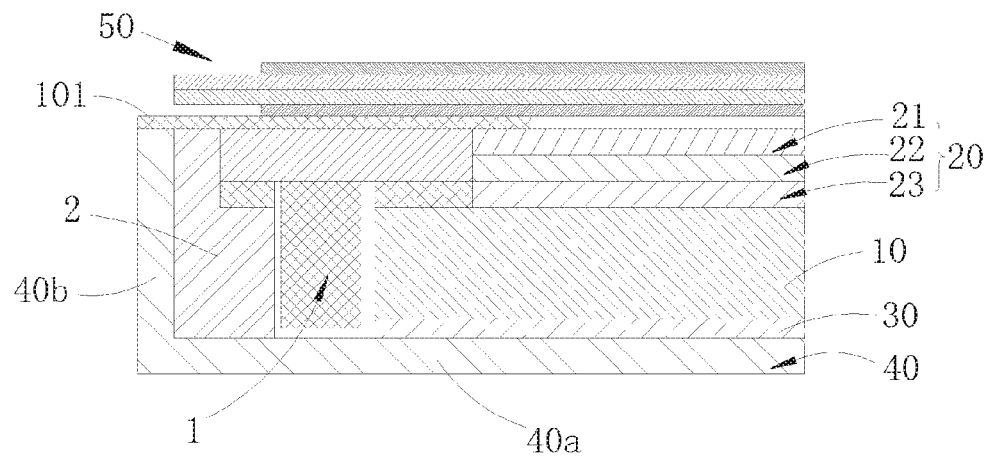
FIG. 1 is a schematic sectional view of an incidence side of a display device according to an embodiment of the present disclosure.

Referring to FIG. 1, a backlight module according to an embodiment of the present disclosure comprises a light source assembly 1, a frame 2, a light guide plate 10, and an optical assembly 20. The optical assembly 20 and the light guide plate 10 are stacked sequentially from up to down. Specifically, the light source assembly 1 is a light bar formed by a plurality of LED mounted on a circuit substrate. The light source assembly 1 is disposed at a light incidence side of the light guide plate 10. The frame 2 has a structure of a frame body, which surrounds the light source assembly 1, the light guide plate 10 and the optical assembly 20 therein.

Figure 2:
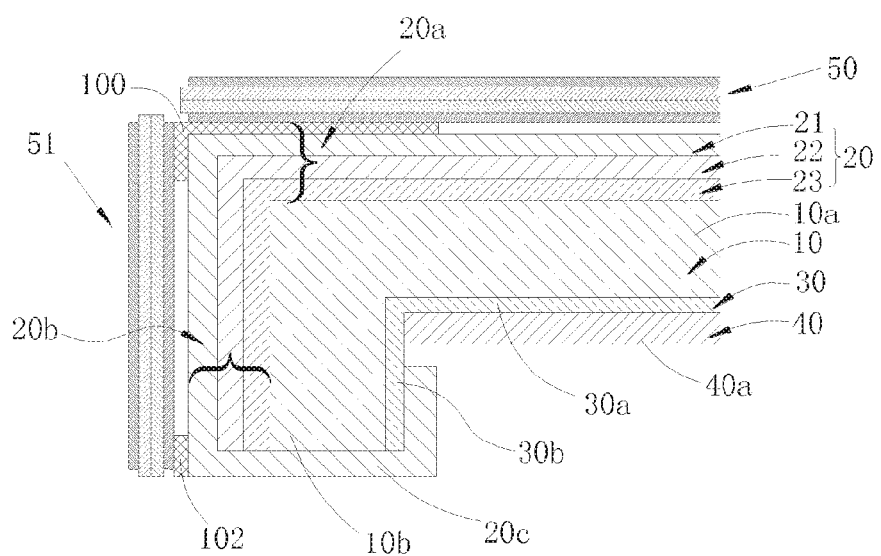
FIG. 2 is a schematic sectional view of a non-incidence side of a display device according to an embodiment of the present disclosure.

Further, as shown in FIG. 2, a side wall of the frame 2 corresponding to at least one non-incidence side is removed, such that an opened structure is formed. The light guide plate 10 comprises a horizontal light guide plate body 10a and a first bent portion 10b located near the non-incidence side. The optical assembly 20 comprises a horizontal optical assembly body 20a and a second bent portion 20b located near the non-incidence side. The optical assembly body 20a is attached tightly to an upper surface of the light guide plate body 10a, and the second bent portion 20b is attached tightly to the first bent portion 10b.

A reflecting sheet 30 attached tightly to the light guide plate 10 is disposed at a lower surface of the light guide plate 10. The reflecting sheet 30 comprises a horizontal reflect sheeting body 30a and a third bent portion 30b located near the non-incidence side. The third bent portion 30b is attached tightly to the first bent portion 10b, such that the light guide plate 10 and the reflecting sheet 30 are attached together fully and tightly.

The backlight module may further comprise a back plate 40 having a horizontal back plate body 40a and a vertical side wall 40b. The back plate body 40a is attached tightly to a lower surface of the reflecting sheet body 30a, functioning to support the light source assembly 1, the frame 2, the light guide plate 10, and an optical assembly 20 thereon. The side wall 40b extends from the back plate body 40a, and may be used to protect the structural members within the back plate 40.

A bent angle of the first bent portion 10b with respect to the light guide plate body 10a may be equal to a bent angle of the second bent portion 20b with respect to the optical assembly body 20a, so as to ensure a good contact between respective portions of the light guide plate 10 and the optical assembly 20.

Specifically, a bent angle of the bent portion 10b with respect to the light guide plate body 10a is not larger than 90°. The first bent portion 10b and the second bent portion 20b according to the present embodiment are perpendicular to the light guide plate body 10a and the optical assembly body 20a, respectively.

One end of the optical assembly which is near the non-incidence side has a packing portion 20c extending from the second bent portion 20b and packing an end of the first bent portion 10b, such that the structure of the backlight module becomes more compact. Specifically, the optical assembly 20 comprises an upper brightness enhancement sheet 21, a lower brightness enhancement sheet 22 and a diffusion sheet 23 which are stacked sequentially on the upper surface of the light guide plate 10 from up to down, and the packing portion 20 is a portion of the upper brightness enhancement sheet 21. Specifically, the packing portion 20c comprises a first portion (not shown) attached tightly to the first bent portion 10b and a second portion (not shown) formed by bending from the first part. The second portion is attached tightly to corresponding portions of the third bent portion 30b or the first bent portion 10b.

A display device according to an embodiment of the present disclosure comprises a first display panel 50, a second display panel 51 and the backlight module. The first display panel 50 and the second display panel 51 are disposed opposite to an external surface of the optical assembly body 20a and an external surface of the second bent portion 20b, respectively. Specifically, two sides of both of the first display panel 50 and the second display panel 51 in width direction are attached onto the optical assembly 20 by a double-sided light shielding tape. The double-sided light shielding tape comprises a first light shielding tape 100, a second light shielding tape 101, and a third light shielding tape 102. The first light shielding tape 100 is disposed at bent position of the optical assembly body 20a and the second bent portion 20b, and meanwhile attached to lower surfaces of the first display panel 50 and the second display panel 51. The second light shielding tape 101 is disposed at a lower surface of the first display panel 50 located near the light incidence side, and meanwhile attached to a upper surface of the frame 2, a upper surface of the side wall 40b of the back plate 40, and a upper surface of the upper brightness enhancement sheet 21. The third light shielding tape 102 is disposed at the other side of the second display panel 51 which is away from the first light shielding tape 100 in the width direction.

It should understand that the number of the non-incidence side is one, but not limited thereto, and the number of the display panels disposed on the display device is two, but not limited thereto. The light guide plate and the optical assembly are bent corresponding to one end of the non-incidence side to form lateral bent portions. Light from the incidence sides emits not only through the lateral bent portions but also through the upper surface of the backlight module, such that multi-side backlight effect is achieved; meanwhile, the display panel is disposed on the upper surface and the side surface of the backlight module to form a display device, thus the display device can achieve a displaying of upper and at least one side surface, such that advantages such as multi-side displaying, simple structure, low cost and convenient assembling can be achieved, thereby application filed of display device is extended. For example, a touch screen can be disposed at upper surface of lateral displaying portion, and a dummy touch key is disposed on the touch screen, such that multi-dimensional experience of image displaying can be enhanced, as well as space for disposing the dummy touch key can be provided.

The foregoing are only specific embodiments of present disclosure, and it should be noted that various modifications and amendments may be made by those ordinary skilled in the art without departing from the principle of the present disclosure, and these modifications and amendments should be regarded as being within the scope of the present disclosure.

What is claimed is:
1. A backlight module, comprising:
a light guide plate comprising a horizontal light guide plate body and a first bent portion located along a non-incidence light side; and
an optical assembly comprising a horizontal optical assembly body and a second bent portion located near the non-incidence light side;
wherein the optical assembly body is attached to an upper surface of the light guide plate body, and the second bent portion is attached to the first bent portion.

2. The backlight module of claim 1, further comprising a reflecting sheet attached to a lower surface of the light guide plate, the reflecting sheet comprises a horizontal reflecting sheet body and a third bent portion located near the non-incidence light side, and the third bent portion is attached to the first bent portion.

3. The backlight module of claim 2, further comprising a back plate having a horizontal back plate body, and the back plate body is attached to a lower surface of the reflecting sheet body.

4. The backlight module of claim 1, wherein a bent angle of the first bent portion with respect to the light guide plate body is equal to a bent angle of the second bent portion with respect to the optical assembly body.

5. The backlight module of claim 4, wherein the bent angle of the bent portion with respect to the light guide plate body is not larger than 90°.

6. The backlight module of claim 1, wherein the optical assembly further comprises a packing portion located near an end of the non-incidence light side, and the packing portion extends from the second bent portion and packs an end of the first bent portion.

7. The backlight module of claim 6, wherein the optical assembly comprises an upper brightness enhancement sheet, a lower brightness enhancement sheet and a diffusion sheet which are stacked sequentially on an upper surface of the light guide plate from up to down, and the packing portion is a portion of the upper brightness enhancement sheet.

8. The backlight module of claim 2, wherein the optical assembly further comprises a packing portion located near an end of the non-incidence light side, and the packing portion extends from the second bent portion and packs an end of the first bent portion.

9. The backlight module of claim 8, wherein the optical assembly comprises an upper brightness enhancement sheet, a lower brightness enhancement sheet and a diffusion sheet which are stacked sequentially on an upper surface of the light guide plate from up to down, and the packing portion is a portion of the upper brightness enhancement sheet.

10. The backlight module of claim 3, wherein the optical assembly further comprises a packing portion located near an end of the non-incidence light side, and the packing portion extends from the second bent portion and packs an end of the first bent portion.

11. The backlight module of claim 10, wherein the optical assembly comprises an upper brightness enhancement sheet, a lower brightness enhancement sheet and a diffusion sheet which are stacked sequentially on an upper surface of the light guide plate from up to down, and the packing portion is a portion of the upper brightness enhancement sheet.

12. The backlight module of claim 4, wherein the optical assembly further comprises a packing portion located near an end of the non-incidence light side, and the packing portion extends from the second bent portion and packs an end of the first bent portion.

13. The backlight module of claim 12, wherein the optical assembly comprises an upper brightness enhancement sheet, a lower brightness enhancement sheet and a diffusion sheet which are stacked sequentially on an upper surface of the light guide plate from up to down, and the packing portion is a portion of the upper brightness enhancement sheet.

14. A display device comprising:
a first display panel,
a second display panel, and
a backlight module, comprising:
a light guide plate comprising a horizontal light guide plate body and a first bent portion located along a non-incidence light side; and
an optical assembly comprising a horizontal optical assembly body and a second bent portion located near the non-incidence light side;
wherein the optical assembly body is attached to an upper surface of the light guide plate body, and the second bent portion is attached to the first bent portion
wherein, the first display panel and the second display panel are disposed opposite to an external surface of the optical assembly body and an external surface of the second bent portion, respectively.

15. The display device of claim 14, wherein a bent angle of the first bent portion with respect to the light guide plate body is equal to a bent angle of the second bent portion with respect to the optical assembly body.

16. The display device of claim 14, wherein the optical assembly further comprises a packing portion located near an end of the non-incidence light side, and the packing portion extends from the second bent portion and packs an end of the first bent portion.

17. The display device of claim 14, wherein two sides of both of the first display panel and the second display panel in width direction are attached onto the optical assembly by a double-sided light shielding tape.

18. The display device of claim 17, wherein the double-sided light shielding tape comprises a first light shielding tape disposed at bent position of the optical assembly body and the second bent portion and meanwhile attached to lower surfaces of the first display panel and the second display panel.

19. The display device of claim 16, wherein two sides of both of the first display panel and the second display panel in width direction are attached onto the optical assembly by a double-sided light shielding tape.

20. The display device of claim 19, wherein the double-sided light shielding tape comprises a first light shielding tape disposed at bent position of the optical assembly body and the second bent portion and meanwhile attached to lower surfaces of the first display panel and the second display panel.

* * * * *